United States Patent [19]
Ono et al.

[11] Patent Number: 4,778,080
[45] Date of Patent: Oct. 18, 1988

[54] METERING DISPENSER OF A SCREW PUMP

[75] Inventors: Tuneo Ono, Kobe; Hisatosi Izumi, Shiga; Shuji Kijima, Kobe, all of Japan

[73] Assignee: Heishin Sobi Kabushiki Kaisha, Kobe, Japan

[21] Appl. No.: 125,146

[22] Filed: Nov. 25, 1987

[30] Foreign Application Priority Data

Dec. 4, 1986 [JP] Japan .............................. 61-187103[U]
Mar. 6, 1987 [JP] Japan .............................. 62-33357[U]

[51] Int. Cl.⁴ .......................... B67D 5/48; B67D 5/52
[52] U.S. Cl. ...................................... 222/55; 222/56; 222/255; 222/413; 222/542; 417/295; 418/48
[58] Field of Search ................................ 222/55–56, 222/255, 410, 413, 412, 542; 251/5; 137/565; 138/30; 417/310, 295; 418/48

[56] References Cited

U.S. PATENT DOCUMENTS 4,682,710 7/1987 Turner, Jr. et al. ............. 222/333 X

FOREIGN PATENT DOCUMENTS 143587 9/1980 German Democratic Rep. .................................... 222/413

OTHER PUBLICATIONS

Technical Article of Japan Accumulator Co. in Shizuoka, Japan.

Primary Examiner—Charles A. Marmor
Attorney, Agent, or Firm—Marshall, O'Toole, Gerstein, Murray & Bicknell

[57] ABSTRACT

This disclosure relates to a metering dispenser which dispenses fluid in accurate proportion to the pump revolution speed, and to an improved shaft seal for the motor drive shaft of a metering dispenser. An elastic sleeve membrane is mounted inside an expanded area provided in a part of the peripheral wall of the pump casing so that a constant-pressure chamber is formed to the outside of this sleeve membrane, and the pressure inside the pump casing is maintained within a set pressure range by introducing a pressurized fluid into this constant-pressure chamber and releasing the pressurizing fluid from the constan-pressure chamber as needed. The improved shaft seal includes a circular channel formed at the center of the shaft seal, this circular channel and the aforementioned constant-pressure chamber being linked, and the internal pressure of the pump casing acting upon the pressure inside this circular channel via the elastic sleeve membrane of the constant-pressure chamber so that the pressure inside the circular channel and the internal pressure of the pump casing are always equal.

4 Claims, 3 Drawing Sheets

FIG. 1
FIG. 2
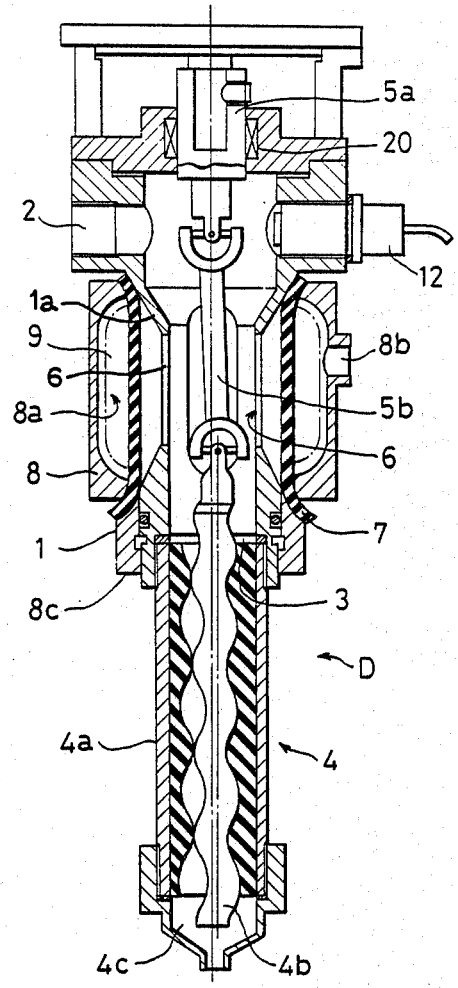
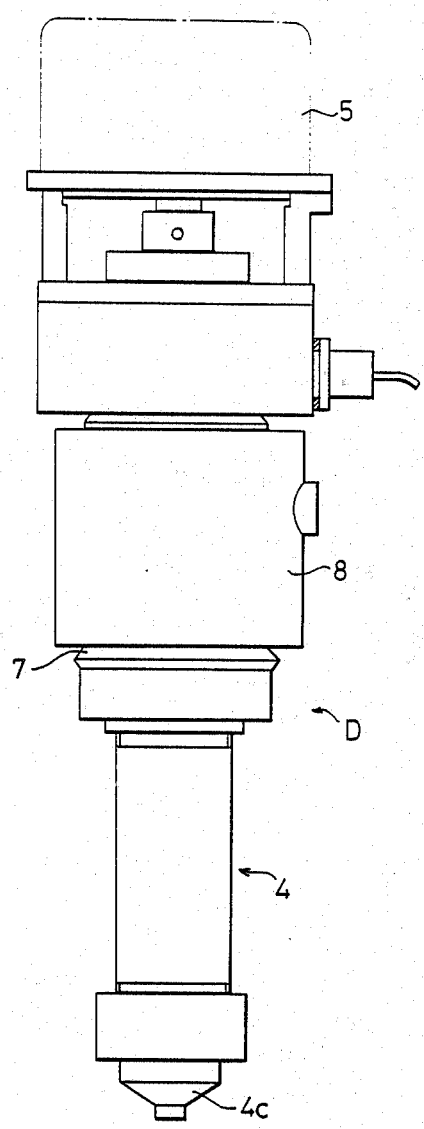

METERING DISPENSER OF A SCREW PUMP

FIELD AND BACKGROUND OF THE INVENTION

This invention relates to a metering dispenser which, in fluid dispensing work in which the fluid inside a supply tank is supplied to the metering dispenser by a single-shaft eccentric screw pump, etc., and then applied by said metering dispenser, ensures that the amount of the fluid dispensed from said metering dispenser is in accurate proportion to the revolution speed of the metering dispenser pump, and it especially relates to a metering dispenser which is well-suited for the metered dispensing of fluids such as high-viscosity fluids and adhesives in combination with a robot device. In addition, this invention also relates to an improved version of a shaft seal device for the motor drive shaft of the aforementioned type of metering dispenser.

If the fluid supply tank and the metering dispenser are separated at a considerable distance, or if the fluid is being supplied to multiple metering dispensers simultaneously, it is necessary to use a supply tank pump which has a greater dispensing pressure than that of the metering dispenser pump(s) in order to supply the fluid to the metering dispenser(s). However, in this type of situation, it is common to use a displacement pump, in which the dispensing rate is in direct proportion to the pump's rotor revolution speed, for both the supply tank pump and the metering dispenser pump(s).

In accordance with the prior art, as shown in FIG. 5 herein, a pressure sensor 12 provided on the metering dispenser D will detect the internal pressure in order to regulate the output of the pump 13 of the supply tank 15 so that the pressure inside the metering dispenser D is maintained within the specified pressure range. Note that, in FIG. 5, the numeral 4 indicates a single-shaft eccentric screw pump, 4c is a nozzle, 5 is the drive motor of the pump 4, 14 is the drive motor of the pump 13, and 16 is a control device.

In addition, the shaft seal device commonly used for the shaft seal of the drive shaft 5a of the pump 5 consisted of, as shown in FIG. 6, a construction in which multiple packing rings 20 were mounted between the end of the drive shaft 5a and the shaft seal 18 through which said drive shaft 5a passed, and this construction was intended to prevent any leakage.

PROBLEMS OF THE PRIOR ART

With the prior art dispenser described above, if the internal pressure of the metering dispenser is at the lower-limit set pressure, even if the drive for the supply tank pump (main pump) is started, because the internal pressure of the metering dispenser cannot increase immediately, there will be an interruption in the dispensing of the fluid from the metering dispenser. Conversely, if the internal pressure of the metering dispenser is at the upper-limit set pressure, even if the drive for the supply tank pump (main pump) is stopped, because the internal pressure of the metering dispenser cannot drop immediately, there will be an increase in the dispensing rate of fluid from the metering dispenser, and, if the metering dispenser pump is stopped, there is the chance of leakage of the fluid.

In addition, the present applicant has filed a patent application in Japan and in the United States for an apparatus which combined a metering dispenser with a robot device in order to make it possible to automatically dispense a metered amount of fluid along a designated dispensing line. The purpose of the apparatus was to regulate the revolution speed of the metering dispenser pump in proportion to the movement speed of the robot device in order to maintain a constant width for the fluid dispensing line irrespective of changes in the movement speed of the robot device. In this case, in order to maintain a constant width for the fluid dispensing line, the dispensing of the fluid from the metering dispenser must be carried out in accurate proportion to the pump revolution speed.

In order to accomplish the purposes of the above apparatus, it is necessary to maintain the internal pressure of the metering dispenser within a designated pressure range.

In addition, when an external pump (main pump) is used to supply the fluid under high pressure to the pump casing of the metering dispenser, as in the metering dispenser already described, this high pressure will act upon the shaft seal, thus causing frequent leakage out through the shaft seal of the fluid in the pump casing. Especially if the fluid contains large amounts of solid matter, such as slurry, this solid matter will enter into the saft seal and could quickly damage the packing rings and possibly lead to abnormal wear of the drive shaft.

OBJECTIVE OF THE INVENTION

The objective of this invention is to provide a metering dispenser which, when a fluid is supplied by a main pump at the supply tank to a metering dispenser provided with its own pump, is capable of constantly maintaining the internal pressure of the metering dispenser within a set pressure range irrespective of the driven or stopped state of the main pump, and which is capable of steadily and consistently dispensing a metered amount of the fluid with no leakage of the fluid. In addition, another objective of this invention is the provision of a shaft seal device capable of minimizing the entrance of the fluid from the pump casing into the shaft seal, even when the pressure inside the casing is considerably higher than the atmospheric pressure.

SUMMARY OF THE INVENTION

The main point of this invention for the fulfillment of the objectives described above can be summarized as follows.

In a metering dispenser in which a fluid supply port, to which the fluid from a fluid supply tank is supplied by a main pump, is formed at the base of a cylindrically shaped pump casing, and a pump, to the front end of which is mounted a dispensing nozzle, is provided at the front end of said pump casing: a part of the peripheral wall of said pump casing is slightly expanded radially outwardly; an elastic sleeve membrane is provided inside this expanded section so that a constant-pressure chamber is formed to the outside of said elastic sleeve membrane; an inlet/outlet port for a pressurizing fluid is provided in the peripheral wall of said expanded section; a pressurizing fluid source is connected to said inlet/outlet port via a switching valve; and a pressure sensor is provided inside the pump casing at an appropriate location in order to stop the main pump and switch said switching valve so that the pressure inside the constant-pressure chamber is released when an upper-limit set pressure is detected, and also to operate the main pump and switch said switching valve so that the pressurizing fluid is introduced into the constant-pressure chamber when a lower-limit set pressure is detected.

With the metering dispenser of this invention, if the driving of the main pump for the supply tank is stopped while the pressure inside the pump casing for the metering dispenser to which the fluid is supplied from the main pump is at the upper-limit set pressure, although the internal pressure of the metering dispenser (pump casing) will have a tendency to increase under the influence of residual pressure, etc., because the pressure inside the constant-pressure chamber to the outside of the elastic sleeve membrane is approximately the same as the atmospheric pressure due to the release of pressure through the switching valve, the difference between the internal and external pressures causes the elastic sleeve membrane to expand outwardly, thus increasing the capacity inside the metering dispenser and allowing the internal pressure of the metering dispenser to drop.

On the other hand, although the driving of the main pump will begin when the pressure inside the metering dispenser reaches the lower-limit set pressure, because there is a delay in time before the pressure from the main pump can reach the metering dispenser, the internal pressure of the metering dispenser (pump casing) cannot rise immediately after the driving of the main pump is begun, and, conversely, if an attempt to use the metering dispenser were to be made while it is in this state, the internal pressure would have a tendency to drop below the lower-limit set pressure, however, because a pressurizing fluid is introduced into the constant-pressure chamber to the outside of the elastic sleeve membrane when the internal pressure of the metering dispenser reaches the lower-limit set pressure, the elastic sleeve membrane is forced inward, thus reducing the capacity inside the metering dispenser so that the internal pressure of the metering dispenser increases so that appropriate fluid dispensing work can be performed.

In addition, another major point of this invention is that a circular channel is formed at approximately the center of the shaft seal of the end of the drive shaft which projects into the aforementioned pump casing, packing rings are provided on both sides of this circular channel, and the circular channel and the aforementioned constant-pressure chamber are linked by a connecting pipe and filled with a pressurizing fluid which does not contain any solid matter.

With the shaft seal device of this invention, the pressure inside the constant-pressure chamber, which is essentially equal to the pressure inside the pump casing, is transmitted to the circular channel located at approximately the center of the shaft seal. Thus, the pressure inside the pump casing and the pressure inside the circular channel are equal, so that the packing rings on the pump casing completely prevent the entrance into the shaft seal of any of the fluid in the pump casing.

BRIEF DESCRIPTION OF THE DRAWINGS

FIG. 1 is a cross-sectional view of an embodiment of the metering dispenser of this invention;

FIG. 2 is a front view of the same embodiment as shown in FIG. 1;

In FIGS. 1 through 3, D is a metering dispenser, and a fluid supply port 2 is provided at the case of the peripheral wall of the cylindrically shaped pump casing 1 of this metering dispenser D. In addition, the base of a single-shaft eccentric screw pump 4, to the front end of which is mounted a fluid dispensing nozzle 4c, is connected to the front-end opening 3 of this pump casing 1.

Figure 3:
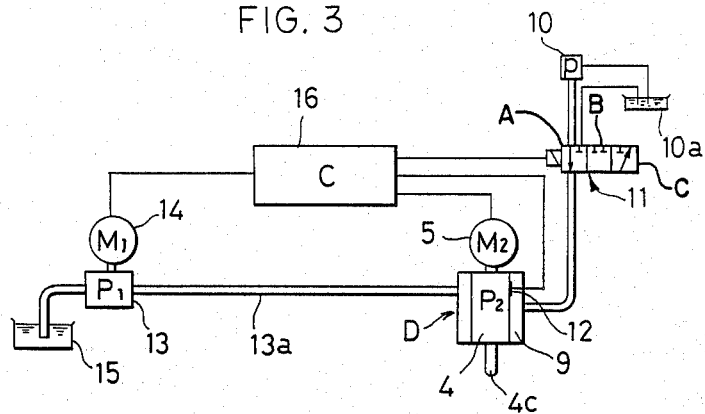
FIG. 3 is an overall system schematic diagram of the metering dispenser.

This pump 4 comprises a stator 4a in the shape of a female or internal thread and a rotor 4b in the shape of a male or external thread which revolves inside the spiral cavity, which has an oval cross section, of the stator 4a. The rotor 4b is linked via a connecting rod 5b to the drive shaft 5a of a drive motor 5 (see FIG. 3) provided on the pump casing 1. Note that a servo motor with a variable revolution speed is usually used for the drive motor 5. In addition, packing rings 20 are arranged around the drive shaft 5a.

From the center to the front end of the peripheral wall 1a of the pump casing 1, the peripheral wall 1a extends inward, thus slightly contracting the cross section of the central opening, and multiple elongated connecting ports 6 are provided in this contracted peripheral wall 1a. The numeral 8 is a cylindrically shaped outer sleeve, the inner peripheral surface of which forms a circular cavity 8a, and a pressurizing fluid inlet/outlet port 8b is provided through this sleeve 8. Also, although this sleeve 8 is secured to the casing by a securing fixture 8c so that it surrounds the connecting ports 6 at the center of the peripheral wall of the pump casing 1, an elastic sleeve membrane 7, made for example of rubber, is mounted in between the sleeve 8 and the center part of the peripheral wall 1a of the pump casing 1, thus forming a constant-pressure chamber 9 between the sleeve 8 and the outside of the elastic sleeve membrane 7 when a pressurizing fluid is in the chamber 9. Note that, as already described, instead of the sleeve 8 being a separate structure from the pump casing 1, it is also possible for a part of the peripheral wall of the pump casing 1 to be slightly expanded radially outwardly and to mount the elastic sleeve membrane 7 inside this expanded section (corresponding to the sleeve 8).

The numeral 10 is a pressure pump (shown in FIG. 3) used as source for the pressurizing fluid, and the dispensing or high pressure port of this pump 10 is connected to the aforementioned pressurizing fluid inlet/outlet port 8b (FIG. 1) via an electromagnetic switching valve 11. Also, the intake port of the pump 10 is connected to a pressurizing fluid supply tank 10a. Furthermore, the pressure release side of the switching valve 11 is also connected to the pressurizing fluid supply tank or reservoir 10a. The switch 11 has three positions A, B and C. When in position A, the switch connects the pump output to the chamber 9; when in position C, the switch closes the pump output and connects the chamber to the reservoir 10a; and when in the neutral position B, the switch closes the lines to the pump output, to the reservoir and to the chamber 9. The switch 11 is moved between these positions by a control 16 in timed relation with the operation of the motors 5 and 14. 12 is a pressure sensor which is located at an appropriate position (in this case on the opposite side from the supply port 2) inside the pump casing 1.

The main pump 13 is a single-shaft eccentric screw pump driven by a drive motor 14 (FIG. 3), and this main pump 13 has the same construction as the screw pump 4 already described. The dispensing port of this main pump 13 is connected to the supply port 2 of the pump casing 1 via a fluid supply pipe 13a, and the intake port is connected to a fluid supply tank 15.

The numeral 16 is a control device (FIG. 3) and it is connected to the drive motors 5 and 14, and also to the switching valve 11 and the pressure sensor 12. When the pressure detected by the pressure sensor 12 reaches a preset upper-limit pressure value, this control device 16, in addition to stopping the drive motor 14 of the supply tank pump 13, also moves the switching valve 11 to position C so that the pressurizing fluid is dispensed from inside the constant-pressure chamber 9 to the reservoir 10a, and, when the pressure detected by the pressure sensor 12 reaches a preset lower-limit pressure value, the control device 16, in addition to operating the drive motor 14 of the supply tank pump 13, also moves the switching valve 11 to position A so that the pressurizing fluid from the outlet of the pump 10 is introduced into the constant-pressure chamber 9. The control 16 includes a timer which automatically returns the switch to the neutral position B after it has been in either of the positions A or C for a short time.

Thus, even if the internal pressure of the pump casing 1 reaches the upper-limit set pressure and has a tendency to rise even further, because the pressure inside the constant-pressure chamber 9 drops to the level of the atmospheric pressure, the elastic sleeve membrane 7 is allowed to expand outwardly by the internal pressure of the fluid within the pump casing 1, thus increasing the volume capacity inside the pump casing 1 and allowing the pressure to drop immediately so that the internal pressure does not exceed the upper-limit set pressure.

Conversely, even if the internal pressure of the pump casing 1 reaches the lower-limit set pressure and has a tendency to drop even further, because the pressurizing fluid is immediately introduced into the constant-pressure chamber 9, the elastic sleeve membrane 7 is pressed inwardly, thus causing the volume capacity inside the pump casing 1 to decrease so that the internal pressure rises above the lower-limit set pressure.

Figure 7A:
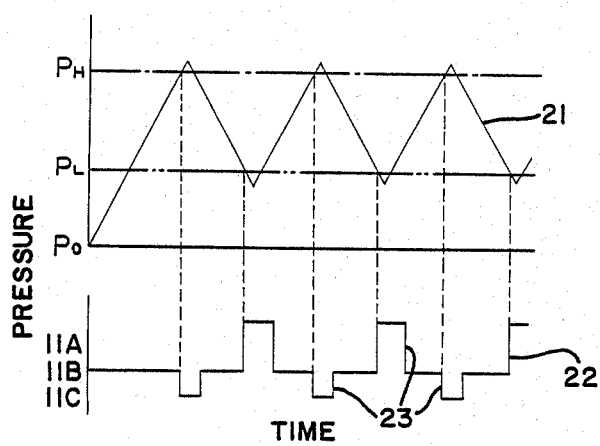
FIG. 7(a) is a graph showing, in the upper half thereof, the conditions of the changes in the internal pressure in a metering dispenser in accordance with the prior art, and in the lower half thereof, the increasing or decreasing condition of the internal pressure of the constant-pressure chamber of the metering dispenser in this invention.
Figure 7B:
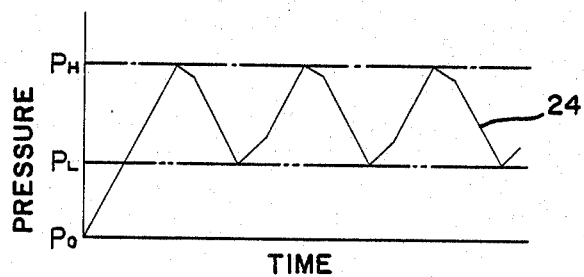
FIG. 7(b) is a graph showing the condition of the changes in the internal pressure in the metering dispenser of this invention, resulting from the action of the constant-pressure chamber.

This operation is illustrated by the graphs of FIG. 7. The line 21 represents the internal pressure within a prior art pump; the line $P_O$ is atmospheric pressure, the line $P_L$ is the lower-limit set pressure, and the line $P_H$ is the upperlimit set pressure. It will be noted that the line 21 actually exceeds and falls below the limits $P_H$ and $P_L$.

The line 22 represents the pressure variation within the chamber 9 which is controlled by the pump 10 and the switch 11. The low pressure 11C exists when the chamber 9 is connected to the reservoir 10a by the position C of the switch 11, and the high pressure 11A exists when the chamber 9 is connected by the switch 11 (when in position A) to the pump output pressure reservoir 10a. The switch 11 further has the neutral position B wherein the chamber 9 is at the pressure 11B. The line 24 represents the pressure within the pump cavity and it will be noted that it does not exceed the high and low pressure limits during normal operation.

In this way, because the pressure inside the pump casing 1 is always maintained between the upper-limit set pressure and the lower-limit set pressure and the fluid is always supplied to the dispensing port of the pump 4 at the lower end of the pump casing 1 at an appropriate pressure, the amount of fluid dispensed is in correct proportion to the revolution speed of the rotor 4b.

Figure 4:
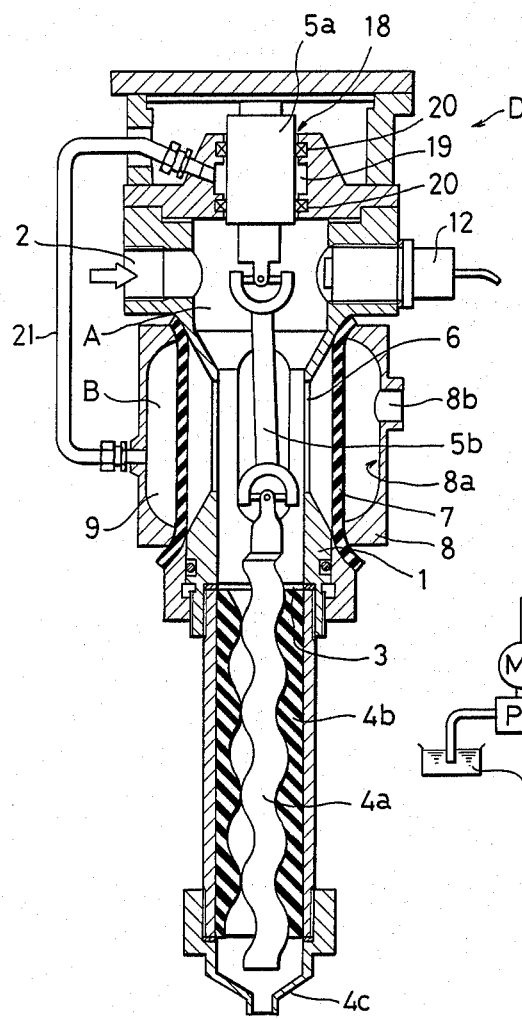
FIG. 4 is a cross-sectional view of another embodiment provided with the shaft seal device of this invention.
Figure 5:
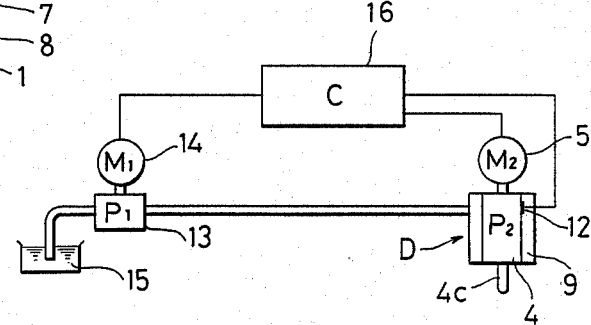
FIG. 5 is an overall system schematic diagram of a common metering dispenser in accordance with the prior art.
Figure 6:
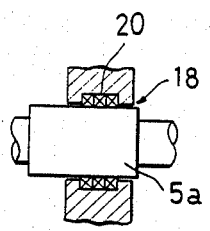
FIG. 6 is a cross-sectional view of a common shaft seal device in accordance with the prior art.

The following is a detailed explanation of the metering dispenser of this invention provided with a shaft seal device illustrated in FIG. 4.

The differences between this embodiment and the embodiment already explained are that a circular channel 19 is formed at approximately the center of the shaft seal 18 which is located at the end of the aforementioned drive shaft 5a. Packing rings 20 are positioned between the drive shaft 5a and the shaft seal 18 on both sides of the circular channel 19. The aforementioned constant-pressure chamber 9 and the circular channel 19 are connected by a connecting pipe 21, and, as a pressurizing fluid, the constant-pressure chamber 9, the circular channel 19, and the connecting pipe 21 are filled with a fluid A which does not contain any solid matter.

In addition, the only difference in operation from the already explained embodiment is in the sealing function of the shaft seal 18. In other words, the pressure of the constant-pressure chamber 9, which is essentially equal to the pressure of the pump casing 1, is constantly transmitted to the inside of the circular channel 19 via the medium of the fluid, and thus the pressure inside the pump casing 1 and the pressure inside the circular channel 19 are approximately equal. Therefore, the entrance of the fluid in the pump casing 1 into the shaft seal 18 is completely prevented by the packing rings 20 provided on the shaft seal 18 to the inside of the circular channel 19.

Furthermore, although the pressure inside the circular channel 19 is considerably higher than the atmospheric pressure, because packing rings 20 are also provided on the shaft seal 18 to the outside of the circular channel 19, any leakage to the outside is usually prevented by these packing rings 20. In addition, even supposing that the pressure inside the circular channel 19 became abnormally high and the fluid leaked from the circular channel 19 to the outside, because the fluid is a pure fluid containing no solid matter whatsoever, there would be no harmful effects on the drive shaft 5a or the shaft seal 18.

Note that, when the pressure inside the pump casing 1 is maintained at a constant pressure by the increasing-/decreasing action of the constant-pressure chamber 9 via the elastic sleeve membrane 7, even if there is a temporary difference in pressure between the pump casing 1 and the circular channel 19, because the pressures of the pump casing 1 and the constant-pressure chamber 9 immediately become equal, the pressures inside the circular channel 19 and the pump casing 1 also immediately become equal.

As heretofore explained, because the metering dispenser of this invention features the construction described, it provides the following advantages.

(1) Because the internal pressure of the pump casing is always maintained within a set pressure range regardless of whether the main pump for the supply tank is driven or stopped, the dispensing of the fluid is performed in accurate proportion to the revolution speed of the pump, thus making possible the steady and consistent dispensing of a metered amount of the fluid so that the fluid can be applied in a uniform coating onto the object onto which it is being applied.

(2) When multiple metering dispensers are connected to the same main pump with supply tank for simultaneous use, each metering dispenser can be used freely without having to use an accumulator (a pressure adjustment device).

(3) Because there is virtually no difference in pressure between the circular channel on the shaft seal and the inside of the pump casing, and because there are packing rings provided between the two areas, it is possible to minimize the entrance of the fluid into the shaft seal. Thus, even if the fluid contains large amounts of solid matter, there is no chance of damage to the drive shaft or to the packing rings inside the shaft seal from the fluid, and these parts can be used for a longer period of time.

What is claimed is

1. A metering dispenser for use with a screw pump, comprising a cylindrically shaped pump casing forming an interior opening, a fluid supply port adapted to receive fluid from a main pump formed in said casing, the front end of the pump casing being adapted to be connected to a screw pump, an enlarged peripheral wall formed around said pump casing, an elastic sleeve membrane mounted inside said peripheral wall and forming a constant-pressure chamber outside of said elastic sleeve membrane; an inlet/outlet port for a pressurizing fluid provided in said peripheral wall; a pressurizing fluid source being connected to said inlet/outlet port via a switching valve; and a pressure sensor mounted inside said pump casing and operable to stop said main pump and switch said switching valve so that the pressure inside said constant-pressure chamber is released when an upper-limit set pressure is detected, and also to start said main pump and switch the switching valve so that the pressurizing fluid is introduced into said constant-pressure chamber when a lower-limit set pressure is detected.

2. A metering dispenser as set forth in claim 1, wherein from the center to the front end of said pump casing, said casing extends inwardly, thus slightly contracting the cross section of said interior opening; multiple elongated connecting ports being provided in said contracted casing; said peripheral was forming a cylindrically shaped sleeve, the inner peripheral surface of said sleeve forming a circular cavity, and said sleeve being provided with said inlet/outlet port, said sleeve being mounted so that it surrounds said connecting ports; and said elastic sleeve membrane being mounted in between said sleeve and said pump casing, thus forming said constant-pressure chamber between said sleeve and the outside of said elastic sleeve membrane.

3. A metering dispenser as set forth in claims 1 or 2, wherein said main pump and said pump of the metering dispenser are both single-shaft eccentric screw pumps.

4. A metering dispenser as set forth in claim 1, and further including a drive shaft extending through said pump casing, a shaft seal provided between said pump casing and said drive shaft, a circular channel formed at approximately the center of said shaft seal, packing rings provided on both sides of said circular channel, and said circular channel and said constant-pressure chamber being linked by a connecting pipe and filled with a pressurizing fluid which does not contain any solid matter.

* * * * *